July 22, 1924.
B. W. HARRIS
1,501,904
APPARATUS FOR DEVELOPING PHOTOGRAPHS
Filed June 10, 1920
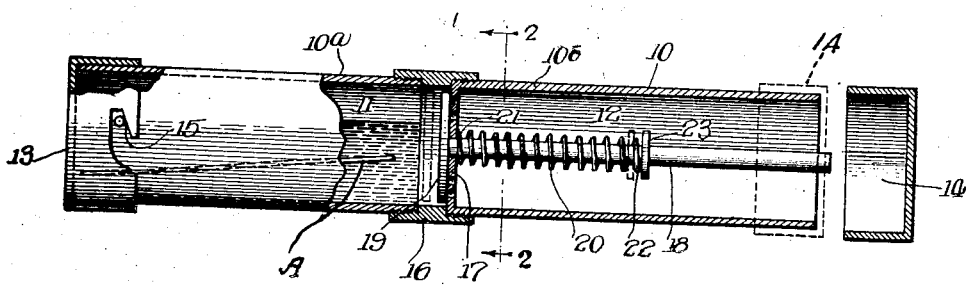
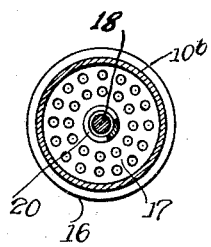
Witness:
O. J. Sauser.
Inventor:
Barnett Walter Harris
By attorney
Rene Carpenter Patented July 22, 1924.

1,501,904

UNITED STATES PATENT OFFICE.

BARNETT WALTER HARRIS, OF CHICAGO, ILLINOIS, ASSIGNOR TO UTILITIES DEVELOPMENT CORPORATION, OF CHICAGO, ILLINOIS, A CORPORATION OF VIRGINIA.

APPARATUS FOR DEVELOPING PHOTOGRAPHS.

Application filed June 10, 1920. Serial No. 387,919.

*To all whom it may concern:*

Be it known that I, BARNETT WALTER HARRIS, a citizen of the United States, and a resident of Chicago, Cook County, Illinois, have invented a certain new and Improved Apparatus for Developing Photographs, of which the following is a specification.

My present invention relates in general to the art of photography, and more particularly to the art of developing and fixing "exposed" photographically sensitive elements, and has particular reference to the provision of improved instrumentalities for the development of photographic exposures without the aid of a dark room or other cumbersome or unwieldly apparatus.

While my present invention, obviously, has a wide range of usefulness, inasmuch as it presents certain features which render it peculiarly adaptable for the purpose of developing portions of the photographically sensitive strips at the present time used in producing the "film negatives", from which are printed the "positives" employed in the projection of motion-pictures upon a screen, I will therefore proceed to describe it in connection with such use and instrumentalities adapted therefor.

As is known to those who are versed in such matters, it is customary in photographing important subjects for motion-picture projection, to take a plurality of sets of views thereof. The employment of at least two photographers with individual cameras for such purpose is quite common, and of three or more not unusual.

While there are several inducements for the employment of at least two photographic equipments, all turning upon the desirability of avoiding a total loss of the subject-matter, due to imperfection of the sensitized film, light leakage in the camera, or mis-judgment of light intensity, any one of which may detract from or even destroy the value of "negatives", it is to be remembered that in view of the present relative reliability of both the camera and the film, the larger factor, where two sets of views of the same subject are taken, and the principal, if not indeed the only one, where more than two sets are made, is the human element, that is the variation in and the fallibility of human judgment where such intangible factors as light values are involved.

Experience teaches that among a group of skilled motion-picture camera operators, rarely will two of them agree as to the precise diaphragm openings and shutter speeds which should be employed at a given time and under stated circumstances.

The true test of the accuracy of the judgment is the film produced, but obviously photographic series for motion-picture projection are largely exposed under conditions which render it impracticable to expose a film portion and then develop it in order to examine the product.

This impracticability is due not alone to the fact that it is often and even generally inexpedient to attempt to provide a darkroom at the point of taking the pictures, both on account of the inconvenience due to bulk and the expenditure of money and of time required, but also to the time factor involved in removing the film from the camera, transporting it to the dark-room, developing the exposed portion, and then returning the film to the camera and installing it therein, or, alternatively, of moving the camera to and from the dark-room.

The principal object of my present invention, therefore, is the provision of an improved apparatus whereby a portion of the film strip may be developed on the spot where the picture is taken, and immediately examined, whereby any mistake in judging the light may be immediately corrected, in order that the best possible picture may be produced.

In considering the description of my invention now to be set forth, it will be borne in mind that, as far as possible, I have endeavored as far as may be practicable to make use of existing instrumentalities in order to simplify the process and make it more generally available to those having occasion to use it and to avoid, as far as circumstances permit, introducing such complications as pertain to special apparatus.

In the accompanying drawings, therefore,

Figure 1 is a longitudinal sectional view of an improved developing apparatus, of general utility, but especially adapted for employment in connection with the purpose outlined above.

Figure 2 is a transverse sectional view, taken on the line 2—2 of Figure 1.

Referring now more particularly to the drawing, it will be observed that I have here shown a device within which to develop a portion of the film to be detached from the reel which carries an exposed motion picture film, the device of Figure 2 being placed within a bag or other light proof container for the insertion thereinto of such detached portion for carrying out the development procedure.

In the development device, 10, as will be seen from inspection of Figure 1 of the drawing, I find it convenient to utilize metal tubing in order to form a pair of chambers, 11, 12 closed at their outer ends by means of cap pieces 13, 14 respectively.

The end cap 13 preferably has such means as the bayonet joint 15 whereby it may be drawn and held closely against the end of the chamber, 11, in order not only to render it light proof, but also more particularly to prevent accidental removal of the cap 13 in attempting to remove the cap 14, by longitudinal traction.

The tubular portions 10ª, 10ᵇ are, in the form of device here shown, threaded into a ring member 16, complementarily threaded to receive them.

Between the structure 10, e. g., between the members 10ª, 10ᵇ is arranged a perforated disc or grid 17, having apertures not alone for the passage of fluid between the chambers 11 and 12, but also an opening forming a journal within which may move the stem 18 carrying a valve disc 19, seating against the perforated disc 17.

The valve 19 is normally moved toward the disc 17 by means of the coiled spring 20, encircling the stem 18. One end 21 of the spring abuts against the disc 17, while the other end 22 thereof is limited by a stop-collar 23, this construction serving to hold the valve disc against the seat 17 when the end cap 14 is removed from the tube 10ᵇ.

The members 17 and 19 not only serve as a valve device between the two chambers 11, 12, but even more particularly as an interrupter, or means for preventing light from entering the chamber 11, and so spoiling the exposed light sensitive film element carried therein, when the cap 14 is withdrawn from the tube portion 10ᵇ for the introduction or removal of fluid from the chamber 12.

When, however, the cap 14 is replaced, it bears against the stem 18, (which projects beyond the outer end of the tube 10ᵇ whenever the cap 14 is removed,) presses it inward and unseats the valve disc 19 from contact with the perforated disc 17, in view of such projection of the stem beyond the outer margin of the tube portion 10ᵇ (see Figure 1).

The process of developing a portion of the film strip A may be readily performed by introducing the developing tube 10 into a reel changing bag, which contains the magazine of the camera, then removing the end cap 13, inserting a piece of the film strip A into the chamber 11, and replacing the end cap 13.

The tube 10 may then be removed from the bag, the cap 14 removed, at which time the disc 19 will move against the disc 17, shutting off all light from the chamber 11. A suitable portion of prepared developing fluid may next be poured into the chamber 12. Replacement of the cap 14 will press the disc 19 away from the disc 17 and permit the developer to flow into the chamber 11, and cover the enclosed portion of the film strip A, if the tube 10 be held at a suitable angle.

After the film portion has remained in the developer for a suitable length of time, the tube 10 may be inverted, permitting reflux of the developing fluid into the chamber 12. The cap 14 may then be removed, which will again close the developing chamber 11, and the expended developer is discharged thereupon from the chamber 12.

Like operations may be carried out in respect of the film washing and fixing baths, but as such operations are mere repetitions of that employed with the developing bath, they will not be further described.

When the film portion has been duly subjected to the last fluid required, the cap 13 may be removed and the resultant fully developed negative withdrawn from the chamber 11 and examined on the spot, whereby its quality may be ascertained, and any required change in the diaphragm stop, shutter speed or other camera setting may be duly effected.

For the maintenance of the desired temperatures of the developing fluid, the fixing fluid and the washing water, such vacuum fluid containers as the so-called "thermos bottles" or the like, adapted for preventing sudden changes of temperature, may be beneficially utilized in transporting such liquids.

From the foregoing description it will be readily perceived that by use of my improved apparatus the photographic defects incident to estimation of light values rather than precise knowledge thereof may be largely, if not entirely, eliminated, according to the knowledge and skill of the camera operator.

Having thus described my invention and illustrated its use, what I claim as new and desire to secure by Letters Patent is—

1. A device of the character described comprising, in combination, a plurality of communicating chambers, means for interrupting the communication between said chambers, and means for rendering said first mentioned means operative only when one of said chambers is open to the admission of light.

2. A device of the character described comprising, in combination, a plurality of communicating chambers, means for interrupting the communication between said chambers, and means for rendering said first mentioned means inoperative when one of said chambers is closed to the admission of light.

3. A device of the character described, comprising in combination, a plurality of communicating chambers, a removable closure for one of said chambers, and means controlled by said closure for interrupting the communication between said chambers.

4. A device of the character described comprising, in combination, a casing having a chamber adapted to receive a member to be developed, an auxiliary fluid container communicating with said chamber, and a slidable valve device actuated from end of said container for controlling the communication between the chamber and container.

5. A device of the character described comprising, in combination, a casing having a plurality of communicating chambers, and bodily movable means for automatically controlling the flow of fluid between said chambers, without permitting the entrance of light.

6. A device of the character described comprising, in combination, a casing having a plurality of communicating chambers and a bodily movable valve device for controlling the flow of fluid between said chambers, without permitting the entrace of light.

7. A device of the character described comprising, in combination, a casing having a plurality of communicating chambers and a valve device for controlling the flow of fluid between said chambers, and means for actuating the valve device operable automatically to close the valve when one of said chambers is open whereby fluid may be introduced into such chamber without permitting the entrance of light into the other of said chambers.

8. A device of the character described comprising, in combination, a casing having a plurality of communicating chambers and a valve device for controlling the flow of fluid between said chambers, and means for actuating the valve device operable to close the valve when one of said chambers is open whereby fluid may be introduced into such chamber without permitting the entrance of light into the other of said chambers and to permit the valve to be opened when said chamber is closed in order to permit the flow of fluid between the chambers.

9. A device of the character described comprising, in combination, a casing having a plurality of communicating chambers, a perforated abutment therebetween, and a valve device for controlling the passage of fluid through said perforated abutment, and means for maintaining the valve normally open when one of said chambers is closed.

10. A device of the character described comprising, in combination, a casing having a plurality of communicating chambers, a perforated abutment therebetween, and a valve device for controlling the passage of fluid through said perforated abutment, and means for maintaining the valve normally open when one of said chambers is closed and normally closed when said chamber is open.

11. A device of the character described comprising, in combination, a casing having a plurality of communicating chambers, a perforated abutment therebetween, and a valve device for controlling the passage of fluid through said perforated abutment, and means for maintaining the valve normally closed when one of said chambers is open.

12. A device of the character described comprising, in combination, a casing having a plurality of communicating chambers, one of which is adapted to receive a member to be developed and the other of which has an opening for the introduction of fluid, a valve device for controlling the flow of fluid between the chambers, and means for actuating the valve device operable to close it when said fluid opening is uncovered and to permit it to be opened when said fluid opening is covered.

13. A device of the character described comprising, in combination, a casing having a plurality of communicating chambers, one of which is adapted to receive a member to be developed and the other of which has an opening for the introduction of fluid, a removable cover for said opening, a valve device for controlling the flow of fluid between the chambers, and means for actuating the valve device arranged to be projected through said opening and operable to close the valve when the cover is removed, and to be retracted through said opening and to open the valve when the cover is replaced.

14. A device of the character described comprising, in combination, a casing having a plurality of communicating chambers, one of which is adapted to receive a member to be developed and the other of which has an opening for the introduction of fluid, a removable cover for said opening, a valve device for controlling the flow of fluid between the chambers, and means, including a spring, for actuating the valve device arranged to be projected through said opening and operable to close the valve when the cover is removed, and to be retracted through said opening and to open the valve when the cover is replaced.

15. A device of the character described comprising, in combination, a casing having a plurality of communicating chambers, one of which is adapted to receive a member to be developed and the other of which has an opening for the introduction of fluid, removable caps for each of said chambers, and a valve device for controlling the flow of fluid between the chambers including a yieldingly mounted valve stem arranged to protrude through one of said chambers and arranged to close the valve, when the cap of such chamber is removed, and to open the valve when said cap is replaced.

16. In a device of the character described, in combination, a casing having a plurality of communicating chambers, one of which is adapted to receive a member to be developed and the other of which has an opening for the introduction of fluid, a valve device for controlling the flow of fluid between the chambers including a valve stem arranged to protrude through one of said chambers, yieldingly resistant means acting upon the valve stem for actuating said valve device to close the valve when the cap of such chamber is removed, and permitting opening the valve when said cap is replaced.

17. In a device of the character described, in combination, a casing having a plurality of communicating chambers, one of which is adapted to receive a member to be developed and the other of which has an opening for the introduction of fluid, a valve device for controlling the flow of fluid between the chambers including a valve stem arranged to protrude through one of said chambers, yieldingly resistant means acting on the valve stem for actuating the valve device to close the valve when such chamber is opened, and permitting opening of the valve when said chamber is closed.

18. A device of the character described, comprising, in combination, a casing having a plurality of communicating chambers, a perforated abutment therebetween, and a valve device for controlling the passage of fluid through said perforated abutment, and means for closing one of the chambers and opening said valve.

19. A device of the character described, comprising, in combination, a casing having a plurality of communicating chambers, a perforated abutment therebetween, and a valve device for controlling the passage of fluid through said perforated abutment, and means for automatically closing the valve when one of said chambers is open.

In testimony whereof I have hereunto signed my name in the presence of the subscribed witness.

BARNETT WALTER HARRIS.

Witness:
PAUL CARPENTER.